(12) United States Patent
James

(10) Patent No.: US 11,134,664 B2
(45) Date of Patent: Oct. 5, 2021

(54) FISHING TACKLE AND METHOD OF USE THEREOF

(71) Applicant: Steven C. James, Dade City, FL (US)

(72) Inventor: Steven C. James, Dade City, FL (US)

( * ) Notice: Subject to any disclaimer, the term of this patent is extended or adjusted under 35 U.S.C. 154(b) by 32 days.

(21) Appl. No.: 16/664,917

(22) Filed: Oct. 27, 2019

(65) Prior Publication Data

US 2021/0120795 A1 Apr. 29, 2021

(51) Int. Cl.
*A01K 91/04* (2006.01)
*A01K 97/02* (2006.01)

(52) U.S. Cl.
CPC ............. *A01K 91/04* (2013.01); *A01K 97/02* (2013.01)

(58) Field of Classification Search
CPC ........ A01K 97/02; A01K 91/03; A01K 91/04; A01K 93/00; A01K 95/00; A01K 95/02
See application file for complete search history.

(56) References Cited

U.S. PATENT DOCUMENTS

| | | | | |
|---|---|---|---|---|
| 595,664 A * | 12/1897 | Wenger | .................. | A01K 93/00 43/44.95 |
| 763,557 A * | 6/1904 | Hachmann | ............. | A01K 93/00 43/44.91 |
| 1,149,033 A * | 8/1915 | Davis | ..................... | A01K 93/00 43/44.92 |
| 1,418,944 A * | 6/1922 | Lower | .................... | A01K 93/00 43/44.95 |
| 2,067,165 A * | 1/1937 | Albiser | .................. | A01K 93/00 43/44.94 |
| 2,163,483 A * | 6/1939 | Carlisle | .................. | A01K 93/00 43/44.95 |
| 2,406,252 A | 8/1946 | Potter | | |
| 2,573,981 A * | 11/1951 | Nelson | .................. | A01K 95/00 43/43.12 |
| 2,587,311 A * | 2/1952 | Golnick | ................. | A01K 93/00 43/44.93 |
| 2,983,065 A | 5/1961 | Ferguson et al. | | |
| 3,034,251 A * | 5/1962 | Seigle | ..................... | A01K 91/04 43/44.87 |
| RE26,096 E * | 10/1966 | Lambach | ............... | A01K 93/00 43/44.95 |
| 3,694,951 A | 10/1972 | Modeme | | |

(Continued)

FOREIGN PATENT DOCUMENTS

| | | | | |
|---|---|---|---|---|
| CH | 256404 A * | 8/1948 | ............. | A01K 93/00 |
| DE | 2106820 A1 * | 8/1972 | ............. | A01K 93/00 |

(Continued)

*Primary Examiner* — Peter M Poon
*Assistant Examiner* — Morgan T Barlow
(74) *Attorney, Agent, or Firm* — Robert C. Corbett; Technology Law, PLLC

(57) ABSTRACT

Fishing tackle has a body with two ends, each end defining a respective groove. The fishing tackle also includes two fastening elements, each being movably connected to the body at a respective one of the ends. The first and second fastening elements are selectively movable between respective first and second positions with respect to the body. In their first positions, the fastening elements do not obstruct the grooves, thereby permitting a fishing line to be inserted into the grooves or removed from the grooves. In their second positions, the fastening elements obstruct the grooves, thereby retaining fishing line within the grooves.

4 Claims, 3 Drawing Sheets

(56) References Cited

U.S. PATENT DOCUMENTS

| | | | | |
|---|---|---|---|---|
| 3,852,906 A | * | 12/1974 | LaForce | A01K 95/00 43/43.14 |
| 3,877,737 A | * | 4/1975 | Chappell | A01K 91/04 289/17 |
| 4,574,515 A | * | 3/1986 | Garner | A01K 93/00 43/43.11 |
| 4,750,289 A | * | 6/1988 | Rossa | A01K 95/00 43/44.96 |
| 5,113,608 A | * | 5/1992 | Hook | A01K 91/04 43/42.36 |
| 5,412,897 A | | 5/1995 | Smith | |
| 5,412,902 A | * | 5/1995 | Hicks | A01K 93/00 43/44.87 |
| 5,560,144 A | | 10/1996 | Hallowell et al. | |
| 5,617,669 A | * | 4/1997 | Levey | A01K 97/02 43/42.06 |
| 6,138,400 A | * | 10/2000 | Gervae | A01K 97/02 43/44.99 |
| 6,836,997 B2 | | 1/2005 | Cramsey | |
| 7,520,086 B2 | | 4/2009 | Melhorn et al. | |
| 8,261,484 B2 | | 9/2012 | Bono | |
| 8,925,242 B1 | | 1/2015 | Thomson | |
| 2006/0174534 A1 | * | 8/2006 | Melhorn | A01K 91/06 43/42.06 |
| 2006/0218848 A1 | | 10/2006 | Melhorn et al. | |
| 2010/0000142 A1 | * | 1/2010 | Thompson | A01K 97/01 43/4.5 |
| 2012/0180375 A1 | * | 7/2012 | Kavanaugh | A01K 93/00 43/43.1 |
| 2013/0298440 A1 | * | 11/2013 | Miller | A01K 89/00 43/17 |
| 2014/0259865 A1 | * | 9/2014 | Kavanaugh | A01K 91/03 43/17 |
| 2016/0309691 A1 | * | 10/2016 | Ancona | A01K 97/02 |
| 2016/0345564 A1 | * | 12/2016 | Nicosia | A01K 93/00 |
| 2017/0188562 A1 | * | 7/2017 | Taylor | A01K 91/04 |
| 2019/0000053 A1 | * | 1/2019 | Wilson | A01K 91/04 |
| 2019/0216071 A1 | * | 7/2019 | Bennis | A01K 93/02 |
| 2019/0289838 A1 | * | 9/2019 | Bennis | A01K 93/00 |

FOREIGN PATENT DOCUMENTS

| | | | | |
|---|---|---|---|---|
| DE | 3129713 A1 | * | 2/1983 | A01K 93/00 |
| DE | 4232153 A1 | * | 3/1994 | A01K 93/00 |
| EP | 0119074 A1 | * | 9/1984 | A01K 91/20 |
| FR | 793379 A | * | 1/1936 | A01K 93/00 |
| FR | 977652 A | * | 4/1951 | A01K 97/02 |
| FR | 1087448 A | * | 2/1955 | A01K 93/00 |
| FR | 2579071 A1 | * | 9/1986 | A01K 97/02 |
| GB | 191300371 A | * | 11/1913 | A01K 93/00 |
| GB | 474642 A | * | 11/1937 | A01K 93/00 |
| GB | 960870 A | * | 6/1964 | A01K 93/00 |
| GB | 1224134 A | * | 3/1971 | A01K 91/04 |
| GB | 2040651 A | * | 9/1980 | A01K 93/00 |
| GB | 2194721 A | * | 3/1988 | A01K 91/06 |
| JP | 2000166448 A | | 6/2000 | |

* cited by examiner

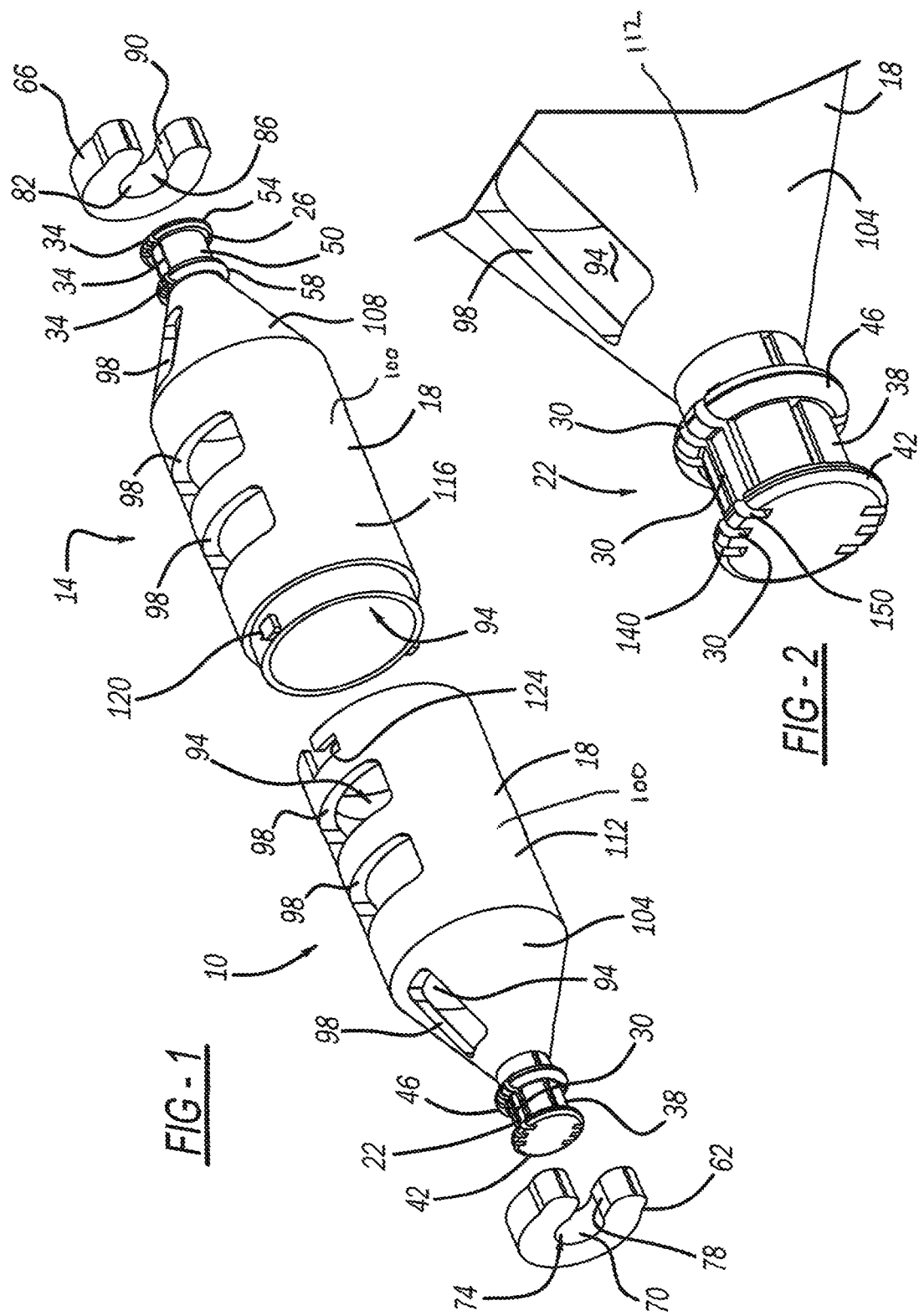

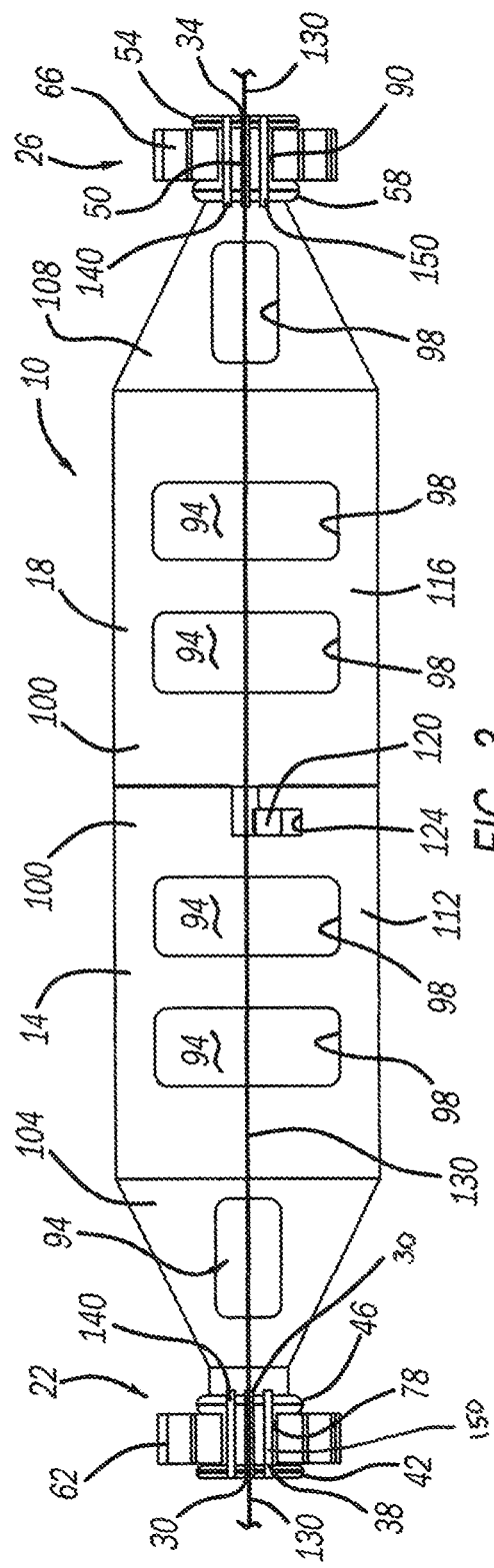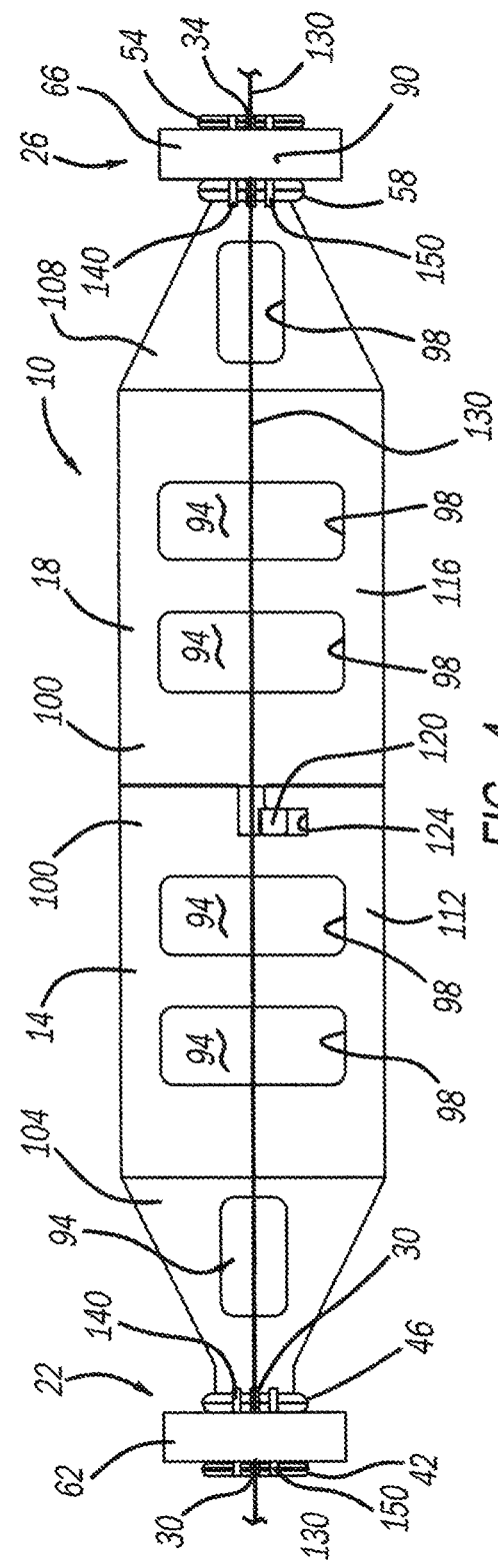

FISHING TACKLE AND METHOD OF USE THEREOF

TECHNICAL FIELD

This disclosure relates to fishing tackle configured for attachment to a fishing line.

BACKGROUND

Angling typically involves the use of various tackle attached to a fishing line, such as bobbers, floats, bait, lures, etc. Often, tackle is attached to fishing line by tying the tackle to the line. Forming knots in the fishing line can be time consuming and difficult. Furthermore, untying the tackle from the line may be difficult due to the nature of the knots formed in the line. Accordingly, releasing tackle from the line often involves cutting the line.

SUMMARY

An apparatus for attaching to a fishing line includes fishing tackle having a body with a first end and a second end. The first end defines a first groove. The said second end defines a second groove. A first fastening element is movably connected to the first end, and a second fastening element is movably connected to the second end. The first and second fastening elements are selectively movable between respective first and second positions with respect to the body. The first fastening element does not obstruct the first groove when the first fastening element is in its first position, but does obstruct the first groove in the second position. Similarly, the second fastening element does not obstruct the second groove when the second fastening element is in its first position, but does obstruct the second groove in the second position.

The apparatus provided enables attachment of the tackle to a fishing line such that the tackle is inline, and permits rapid attachment and detachment from the fishing line. In one embodiment, the tackle is a chum holder.

A corresponding method of use is also provided.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 1 is a schematic, exploded, perspective view of a chum holder assembly in accordance with the claimed invention having a body and two fastening elements;

FIG. 2 is a schematic, perspective view of a portion of the chum holder assembly of FIG. 1;

FIG. 3 is a schematic, top view of the chum holder assembly with the fastening elements in respective first positions relative to the body;

FIG. 4 is a schematic, top view of the chum holder assembly with the fastening elements in respective second positions relative to the body.

DESCRIPTION OF THE PREFERRED EMBODIMENTS

Figure 5:
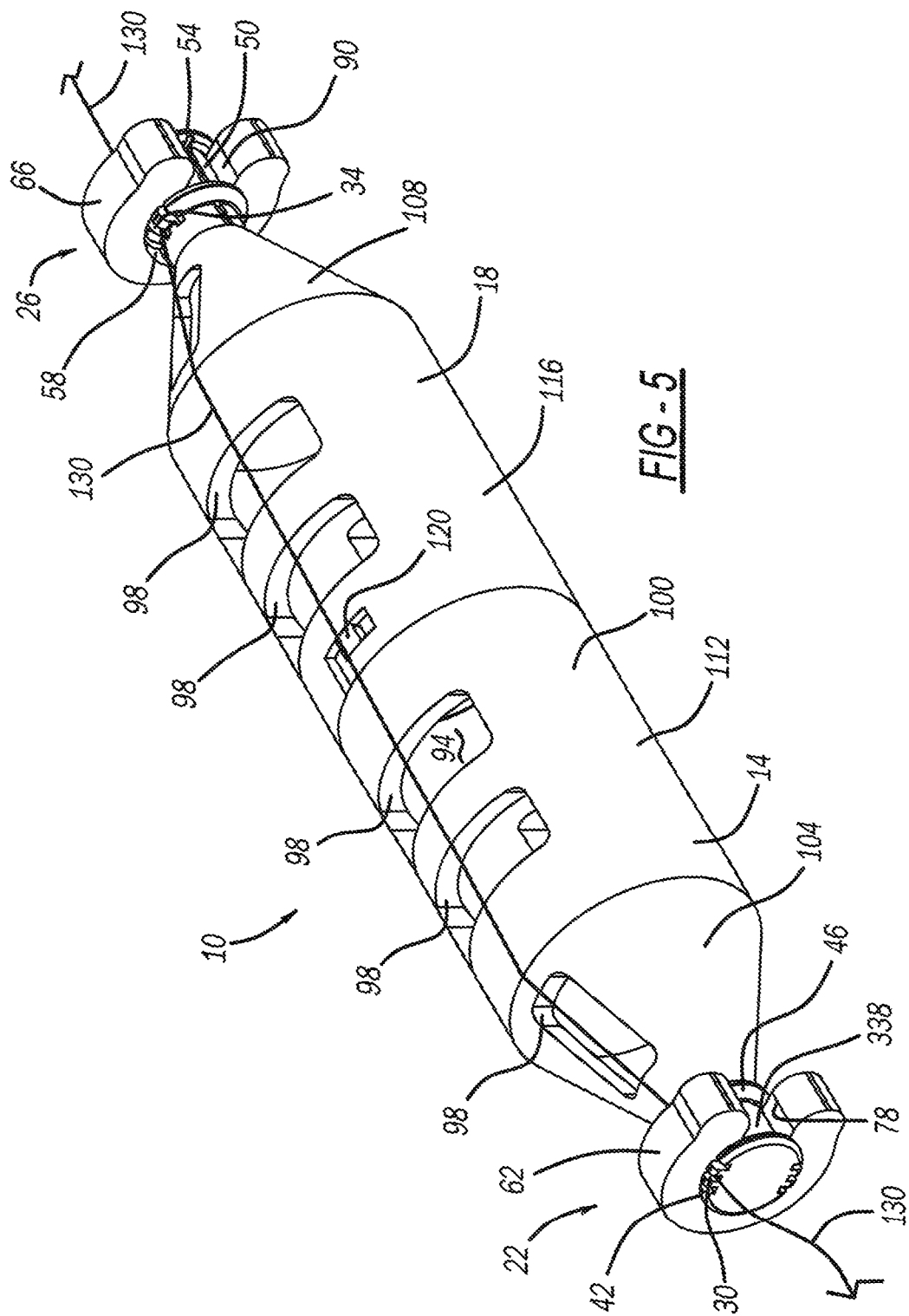
FIG. 5 is a schematic, perspective view of the chum holder assembly with the members in their respective second positions and engaged with a fishing line.

Referring to the Figures, wherein like reference numbers refer to like components throughout, fishing tackle 10 is schematically depicted. In the embodiment shown, the tackle 10 is a chum holder assembly 14. The chum holder assembly 14 includes a body portion 18 with a first end 22 and a second end 26. As best seen in FIG. 2, the first end 22 defines a first groove 30, and the second end 26 defines a second groove 34. More specifically, in the embodiment depicted, the first end 22 defines a first cylindrical segment 38, a first annular protuberance 42 on one side of the first cylindrical segment 38 and a second annular protuberance 46 on the other side of the first cylindrical segment 38. The first groove 30 extends across the first cylindrical segment 38 and through the first and second annular protuberances 42, 46.

The second end 26 is substantially identical to first end 22. The second end 26 defines a second cylindrical segment 50, a third annular protuberance 54 on one side of the second cylindrical segment 50 and a fourth annular protuberance 58 on the other side of the second cylindrical segment 50. The second groove 34 extends across the second cylindrical segment 50 and through the third and fourth annular protuberances 54, 58.

The chum holder assembly 14 also includes a first fastening element 62 movably connected to the first end 22, and a second fastening element 66 movably connected to the second end 26. The first and second fastening elements 62, 66 are generally C-shaped in the embodiment depicted. More specifically, the first fastening element 62 has a first surface 70 defining a first cylindrical cavity 74 having a first opening 78. The first cylindrical segment 38 extends through the first cylindrical cavity 74 such that the first fastening element 62 is rotatable with respect to the end 22 about an axis along the centerline of the first cylindrical segment 38.

The diameters of the first and second annular protuberances 42, 46 are larger than the diameter of the first cylindrical cavity 74, and thus the first and second annular protuberances 42, 46 retain the first fastening element 62 on the first cylindrical segment 38; that is, physical part interference between the protuberances 42, 46 and the first fastening element 62 limit or prevent axial movement of the first fastening element 62 relative to the body portion 18. The thickness of the fastening element 62 is locally higher near the first opening 78 to facilitate rotation of the fastening element 62.

The second fastening element 66 has a second surface 82 defining a second cylindrical cavity 86 having a second opening 90. The second cylindrical segment 50 extends through the second cylindrical cavity 86 such that the second fastening element 66 is rotatable with respect to the end 26 about an axis along the centerline of the second cylindrical segment 50. In the embodiment depicted, the first and second cylindrical segments 38, 50 are coaxial.

The diameters of the third and fourth annular protuberances 54, 58 are larger than the diameter of the second cylindrical cavity 86, and thus the third and fourth annular protuberances 54, 58 retain the second fastening element 66 on the second cylindrical segment 50; that is, physical part interference between the protuberances 54, 58 and the second fastening element 66 limit or prevent axial movement of the second fastening element 66 relative to the body portion 18. The thickness of the fastening element 66 is locally higher near the second opening 90 to facilitate rotation of the fastening element 66.

The first and second fastening elements 62, 66 are selectively movable between respective first and second positions with respect to the body portion 18. The first and second fastening elements 62, 66 are shown in their respective first positions in FIG. 2. Referring specifically to FIG. 2, the first fastening element 62 does not obstruct the first groove 30 when the first fastening element 62 is in its first position. More specifically, the first opening 78 is aligned with the first groove 30 so that the entirety of first groove 30 is accessible through the first opening 78. Similarly, the second fastening element 66 does not obstruct the second groove 34 when the second fastening element 66 is in its first position. The second opening 90 is aligned with the second groove 34 so that the entirety of the second groove 34 is accessible through the second opening 90.

The first and second fastening elements 62, 66 are rotatable to their respective second positions, as shown in FIG. 3. Referring to FIG. 3, the first fastening element 62 obstructs the portion of the first groove 30 that extends across the first cylindrical segment 38 when the first fastening element 62 is in its second position. Similarly, the second fastening element 66 obstructs the portion of the second groove 34 that extends across the second cylindrical segment 50 when the second fastening element 66 is in its second position.

The body portion 18 defines a chamber 94 having a plurality of apertures 98. The chamber 94 is configured to contain chum, and the apertures 98 expose the chum inside the chamber 94 to the water into which the tackle 10 is submerged. In the embodiment depicted, the body portion 18 includes a cylindrical portion 100, with two tapering portions 104, 108 on opposite sides of the cylindrical portion 100. Ends 22, 26 extend from tapering portions 104, 108, respectively. The cylindrical portion 100, tapering portions 104, 108, cylindrical segments 38, 50, and annular protuberances 42, 46, 54, 58 are coaxial.

In the embodiment depicted, the body portion 18 comprises two pieces 112, 116 that are removably attached together. More specifically, piece 112 includes end 22, tapering portion 104, and approximately half of cylindrical portion 100. Piece 116 includes end 26, tapering portion 108, and the other half of cylindrical portion 100. When the pieces 112, 116 are separated, as seen in FIG. 1, the chamber 94 is easily accessed. To connect the pieces 112, 116, a protuberance 120 on piece 116 is inserted into L-shaped channel 124 and the pieces 112, 116 are rotated relative to one another.

A method of use for the tackle 10 includes inserting a fishing line 130 into the first groove 30 through the first opening 78 when the first fastening element 62 is in the first position, as shown in FIG. 2. The method also includes rotating the first fastening element 62 to its second position with the fishing line 130 in the first groove 30, as shown in FIG. 3. The fishing line 130 extends through the first groove 30 in protuberances 42, 46, but is secured to the body 14 by the fastening element 62.

The method also includes inserting the fishing line 130 into the second groove 38 through the second opening 90 when the second fastening element 66 is in its first position, as shown in FIG. 2. The method also includes rotating the second fastening element 66 to its second position with the fishing line 130 in the second groove 38, as shown in FIG. 3. The fishing line 130 extends through the second groove 38 in protuberances 54, 58, but is secured to the body 14 by the fastening element 66.

In the embodiment depicted, the ends 22, 26 each define two additional grooves 140, 150 in addition to the first groove 30 and the second groove 34. The additional grooves are substantially identical to the first and second grooves 30, 34 and may be employed to retain the fishing line 130. The additional grooves facilitate attachment of the fishing line 130 by providing additional mounting points.

Those skilled in the art will recognize a variety of materials that may be employed to form the tackle 10 within the scope of the claimed invention, including, but not limited to, various plastics. Although the tackle 10 is a chum holder 14, other tackle may be employed within the scope of the claimed invention, including, but not limited to, floats and bobbers.

While the best modes for carrying out the invention have been described in detail, those familiar with the art to which this invention relates will recognize various alternative designs and embodiments for practicing the invention within the scope of the appended claims.

The invention claimed is:

1. An apparatus for attaching to a fishing line, comprising:
a fishing tackle assembly having a body with a first end and a second end;
said first end defining a first cylindrical segment, a first annular protuberance on one side of the first cylindrical segment, a second annular protuberance on the other side of the first cylindrical segment, and a first groove that extends across the first cylindrical segment and through the first and second annular protuberances;
said second end defining a second cylindrical segment, a third annular protuberance on one side of the second cylindrical segment, a fourth annular protuberance on the other side of the second cylindrical segment, and a second groove that extends across the second cylindrical segment and through the third and fourth annular protuberances;
a first fastening element having a first surface in contact with the first cylindrical segment between the first and second annular protuberances such that the first and second annular protuberances limit axial movement of the first fastening element, said first surface defining a first cylindrical cavity having a first opening; and
a second fastening element having a second surface in contact with the second cylindrical segment between the third and fourth annular protuberances such that the third and fourth annular protuberances limit axial movement of the second fastening element, said second surface defining a second cylindrical cavity having a second opening.

2. The apparatus of claim 1, wherein the first and second fastening elements are rotatable between respective first and second positions with respect to the body;
wherein the first opening is aligned with the first groove when the first fastening element is in its respective first position such that the first fastening element does not obstruct the first groove;
wherein the second opening is aligned with the second groove when the second fastening element is in its respective first position such that the second fastening element does not obstruct the second groove;
wherein said first fastening element obstructs at least a portion of the first groove when the first fastening element is in its second position; and
wherein said second fastening element obstructs at least a portion of the second groove when the second fastening element is in its second position.

3. The apparatus of claim 1, wherein the body defines a chamber and a plurality of apertures to the chamber.

4. The apparatus of claim 3, wherein the body includes a first portion that defines the first end and a second portion that defines the second end; and wherein the first portion and the second portion are removably attached to each other.

\* \* \* \* \*